US008736667B2

(12) United States Patent　　(10) Patent No.: US 8,736,667 B2
Thorpe et al.　　(45) Date of Patent: May 27, 2014

(54) METHOD AND APPARATUS FOR PROCESSING VIDEO IMAGES

(75) Inventors: Jonathan Richard Thorpe, Abbotts Barton (GB); Hideki Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 12/976,362

(22) Filed: Dec. 22, 2010

(65) Prior Publication Data

US 2011/0211042 A1　Sep. 1, 2011

(30) Foreign Application Priority Data

Feb. 26, 2010　(GB) .................................. 1003291.0

(51) Int. Cl.
*H04N 15/00*　(2006.01)
*H04N 13/00*　(2006.01)
*H04N 13/04*　(2006.01)
*H04N 13/02*　(2006.01)
*H04N 7/32*　(2006.01)

(52) U.S. Cl.
CPC ....... *H04N 13/0044* (2013.01); *H04N 13/0055* (2013.01); *H04N 13/0239* (2013.01); *H04N 13/0059* (2013.01); *H04N 13/0048* (2013.01); *H04N 13/04* (2013.01); *H04N 19/00769* (2013.01)
USPC ..................... 348/43; 348/42; 348/46; 348/51

(58) Field of Classification Search
CPC .................... H04N 13/0055; H04N 19/00769; H04N 13/0239; H04N 13/0059; H04N 13/0048; H04N 13/0044; H04N 13/04
USPC .......................................... 348/43, 42, 46, 51
See application file for complete search history.

(56) References Cited

U.S. PATENT DOCUMENTS 6,512,892 B1 *　1/2003　Montgomery et al. ....... 396/326

8,436,893 B2 *　5/2013　McNamer et al. .............. 348/50

(Continued)

FOREIGN PATENT DOCUMENTS

EP　　　1 865 728 A1　12/2007
EP　　　2 106 150 A2　9/2009
KR　10-2007-0061094　6/2007

OTHER PUBLICATIONS

United Kingdom Search Report dated May 11, 2010 in corresponding United Kingdom Application No. 1003291.0 filed Feb. 26, 2010.

(Continued)

*Primary Examiner* — Geepy Pe
(74) *Attorney, Agent, or Firm* — Oblon, Spivak, McClelland, Maier & Neustadt, L.L.P.

(57) ABSTRACT

A method of cutting between a first image sequence and a second image sequence displayable on a screen which defines a screen plane, wherein the first image sequence includes a stereoscopically viewable object perceivable by a viewer on a first image plane different to the screen plane and the second image sequence including a second object perceivable on a second image plane different to the first image plane, the stereoscopically viewable object comprising a first image at a first screen plane position and a second image at a second screen plane position, the method comprising: identifying the first screen plane position of the first image and the second screen plane position of the second image; inserting into a first post-cut frame of the second image sequence a first copy of the second object substantially at the first screen plane position and inserting a second copy of the second object substantially at the second screen plane position, and inserting the first copy of the second object and the second copy of the second object into a predetermined number of subsequent frames at positions on the screen which are closer to the screen position required to view the second object at the second image plane, than the first and second screen plane position.

35 Claims, 16 Drawing Sheets

(56) References Cited

U.S. PATENT DOCUMENTS

| | | | |
|---|---|---|---|
| 8,472,704 B2* | 6/2013 | Ishiyama et al. | 382/154 |
| 2004/0057612 A1 | 3/2004 | Tabata | |
| 2009/0041336 A1 | 2/2009 | Ku et al. | |
| 2010/0039499 A1* | 2/2010 | Nomura et al. | 348/43 |
| 2010/0046802 A1* | 2/2010 | Watanabe et al. | 382/106 |
| 2010/0142014 A1* | 6/2010 | Rosen et al. | 359/1 |

OTHER PUBLICATIONS

U.S. Appl. No. 13/024,907, filed Feb. 10, 2011, Thorpe, et al.
U.S. Appl. No. 13/015,251, filed Jan. 27, 2011, Thorpe, et al.
U.S. Appl. No. 13/760,714, filed Feb. 6, 2013, Gillard, et al.

* cited by examiner

METHOD AND APPARATUS FOR PROCESSING VIDEO IMAGES

BACKGROUND TO THE INVENTION

1. Field of Invention

The present invention relates to a method and apparatus for processing video images.

2. Background

In order to enhance a viewer's experience when watching video material, it is possible to apply known techniques in order to give a viewer the impression that certain images within the video material have a three dimensional (3D) quality. This is achieved by arranging the video to include a sequence of stereoscopic images in which a viewer sees a first image through one eye and a second image through the other eye. If the first image and the second image are of the same object but the images are horizontally displaced from each other with respect to the viewing plane that the viewer sees (e.g. a television display or a cinema screen), then the viewer reconciles this visual information by perceiving there to be a single image of the object and that this image has a certain degree of depth (i.e. is positioned either in front of or behind the viewing plane). The 3D effect can be enhanced by arranging the two images to be of the same object but captured from slightly different angles. Because human eyes are spaced apart by a small distance, this mimics the information that a viewer sees when a real object is viewed through both eyes thus the viewer perceives the displayed image as a 3D object.

Unlike conventional two-dimensional (2D) video sequences, in order for a viewer to view a 3D image, their eyes must be pointing in slightly different directions due to the horizontal displacement of the displaced version of the same object. When viewing stereoscopic images, unnatural movement of the viewer's eyes can take place. For instance, a viewer's eyes may unnaturally diverge, may converge too much or may vertically diverge (as a result of vertical parallax in the images). This can lead to discomfort. It can therefore be useful to analyse 3D video sequences to determine the extent to which a viewer must point their eyes in different directions by producing a disparity map which indicates the relative position of the first and second object.

Furthermore, when combining the display of 2D images with 3D images in a video sequence, careful considerations must be made to ensure that the 3D illusion does not break down. This is particularly important in live footage where objects in the footage may move "through" the captions.

SUMMARY OF INVENTION

According to a first aspect of the invention, there is provided a method of cutting between a first image sequence and a second image sequence displayable on a screen which defines a screen plane, wherein the first image sequence includes a stereoscopically viewable object perceivable by a viewer on a first image plane different to the screen plane and the second image sequence including a second object perceivable on a second image plane different to the first image plane, the stereoscopically viewable object comprising a first image at a first screen plane position and a second image at a second screen plane position, the method comprising: identifying the first screen plane position of the first image and the second screen plane position of the second image; inserting into a first post-cut frame of the second image sequence a first copy of the second object substantially at the first screen plane position and inserting a second copy of the second object substantially at the second screen plane position, and inserting the first copy of the second object and the second copy of the second object into a predetermined number of subsequent frames at positions on the screen which are closer to the screen position required to view the second object at the second image plane, than the first and second screen plane position.

The change of the screen position between consecutive frames may be the same over the predetermined number of frames.

The change of the screen position between consecutive frames may vary over the predetermined number of frames.

The change of the screen position may be smaller during a first predefined number of consecutive frames compared with a last predefined number of consecutive frames.

The second image plane may be the screen plane.

The first and second positions may be identified using a disparity map generated by a disparity mapping process.

The image sequence may comprise a first group of stereoscopic image frames viewable by a viewer's eye and a second group of stereoscopic image frames viewable by the viewer's other eye, and the disparity map may be generated by: performing a first edge pixel detection process on the first image frame to identify edges within the first image frame; identifying a feature pixel of the first image from the detected edges; generating a block of pixels including the feature pixel, performing block matching on a search region of the second image using the block of pixels from the first image frame, wherein the block of pixels generated from the first frame is correlated against the search region; and generating a disparity map by identifying a relative displacement of the feature pixel of the first image frame from a corresponding feature pixel in the second image frame.

The method may comprise generating from the disparity map a depth map providing an indication of a distance between the screen plane and the image plane by associating previously defined depth parameters indicating a depth of the stereoscopically viewable first object with the object position identified by the disparity map.

The method may comprise associating the stereoscopically viewable first object with a graphical indicator in dependence on the depth of the stereoscopically viewable first object indicated by the depth map or the disparity map.

The method may comprise associating the stereoscopically viewable first object with the graphical indicator if the depth is equal to or greater than a predetermined threshold parallax value.

The graphical indicator may comprise applying a colour to the 3D image.

The method may comprise performing a second edge pixel detection process on the second image frame to identify edges within the second image frame, determining a predicted edge pixels in the first image frame from an identified edge and the generated disparity map and verifying the disparity map when the position of the predicted edge pixel and the detected edge pixel in the first image are within a predetermined threshold distance.

Prior to the edge pixel detection steps, a sub-harmonic summation process may be applied to an auto-correlated version of at least one of the first image frame and the second image frame to determine a magnitude of a fundamental frequency of a repeating pattern present in the at least one frame, and the edge pixel detection processes and the disparity processing steps are performed in dependence on the magnitude of the fundamental frequency of the at least one image frame.

The disparity map may include horizontal displacement between the corresponding feature pixels and the edge detection process uses a Sobel edge detection technique.

The first edge detection process may include the step of segmenting the first image into a plurality of pixel blocks, and determining the number of edges in each pixel block, wherein if the number of edges is below a threshold value, that pixel block is deemed to have no edges located therein.

The threshold value may be the same as the vertical number of pixels in the pixel block.

If the number of edges detected in a pixel block is above a second threshold value, then the number of edges in that pixel block may be deemed to be the second threshold value.

According to another aspect, there is provided an apparatus for cutting between a first image sequence and a second image sequence displayable on a screen which defines a screen plane, wherein the first image sequence includes a stereoscopically viewable object perceivable by a viewer on a first image plane different to the screen plane and the second image sequence including a second object perceivable on a second image plane different to the first image plane, the stereoscopically viewable object comprising a first image at a first screen plane position and a second image at a second screen plane position, the apparatus comprising: an identifying device operable to identify the first screen plane position of the first image and the second screen plane position of the second image; an inserter operable to insert into a first post-cut frame of the second image sequence a first copy of the second object substantially at the first screen plane position and inserting a second copy of the second object substantially at the second screen plane position, and to insert the first copy of the second object and the second copy of the second object into a predetermined number of subsequent frames at positions on the screen which are closer to the screen position required to view the second object at the second image plane, than the first and second screen plane position.

The change of the screen position between consecutive frames may be the same over the predetermined number of frames.

The change of the screen position between consecutive frames may vary over the predetermined number of frames.

The change of the screen position may be smaller during a first predefined number of consecutive frames compared with a last predefined number of consecutive frames.

The second image plane may be the screen plane.

The first and second positions may be identified using a disparity map generated by a disparity mapping process.

The image sequence may comprise a first group of stereoscopic image frames viewable by a viewer's eye and a second group of stereoscopic image frames viewable by the viewer's other eye, and the disparity map is generated by a disparity map generator operable to: perform a first edge pixel detection process on the first image frame to identify edges within the first image frame; identify a feature pixel of the first image from the detected edges; generate a block of pixels including the feature pixel, perform block matching on a search region of the second image using the block of pixels from the first image frame, wherein the block of pixels generated from the first frame is correlated against the search region; and generate a disparity map by identifying a relative displacement of the feature pixel of the first image frame from a corresponding feature pixel in the second image frame.

The apparatus may comprise a depth map generator operable to generate from the disparity map a depth map providing an indication of a distance between the screen plane and the image plane by associating previously defined depth parameters indicating a depth of the stereoscopically viewable first object with the object position identified by the disparity map.

The apparatus may comprise an association device operable to associate the stereoscopically viewable first object with a graphical indicator in dependence on the depth of the stereoscopically viewable first object indicated by the depth map or the disparity map.

The association device may be operable to associate the stereoscopically viewable first object with the graphical indicator if the depth is equal to or greater than a predetermined threshold parallax value.

The graphical indicator may comprise applying a colour to the 3D image.

The apparatus may comprise wherein the generator is operable to perform a second edge pixel detection process on the second image frame to identify edges within the second image frame, determining a predicted edge pixels in the first image frame from an identified edge and the generated disparity map and verifying the disparity map when the position of the predicted edge pixel and the detected edge pixel in the first image are within a predetermined threshold distance.

Prior to the edge pixel detection steps, a sub-harmonic summation process may be applied to an auto-correlated version of at least one of the first image frame and the second image frame to determine a magnitude of a fundamental frequency of a repeating pattern present in the at least one frame, and the edge pixel detection processes and the disparity processing steps are performed in dependence on the magnitude of the fundamental frequency of the at least one image frame.

The disparity map may include horizontal displacement between the corresponding feature pixels and the edge detection process uses a Sobel edge detection technique.

The first edge detection process may include the step of segmenting the first image into a plurality of pixel blocks, and determining the number of edges in each pixel block, wherein if the number of edges is below a threshold value, that pixel block is deemed to have no edges located therein.

The threshold value may be the same as the vertical number of pixels in the pixel block.

If the number of edges detected in a pixel block is above a second threshold value, then the number of edges in that pixel block may be deemed to be the second threshold value.

Various aspects and features of the present invention are further defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DETAILED DESCRIPTION OF EXAMPLE EMBODIMENTS

Figure 1:
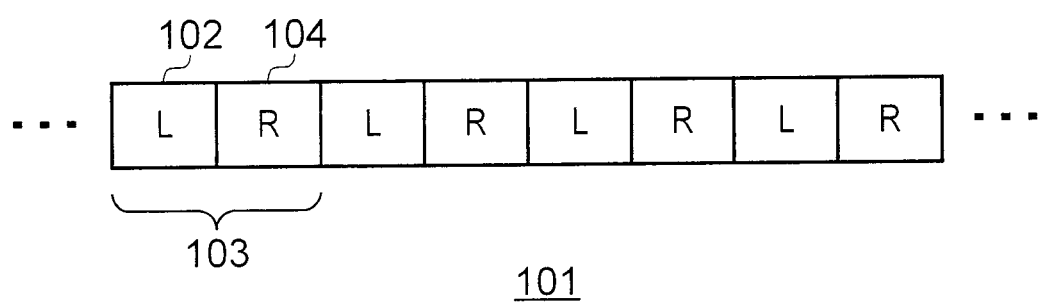
FIG. 1 provides a schematic diagram illustrating a 3D video sequence.

There are a number of techniques for providing stereoscopic (i.e. 3D) images in a video sequence. For example, a viewer can wear a pair of spectacles in which one lens comprises an optical filter which only allows light polarised in one direction to pass through and the other lens comprises an optical filter which only allows light polarised in the other direction to pass through. The viewer then views a video sequence in which 3D images are generated by displaying first and second images, each image displayed with light of a different polarity. This ensures that only one image is seen by each of the viewer's eyes. In a cinema this can be achieved by using two separate projectors to project two versions of the video sequence onto the cinema screen, each different version being passed through a different polarising filter. In televisions and computer monitors this technique can be achieved by providing an adapted interlaced display in which the even line pixels emit light polarised in the first direction and the odd line pixels emit light polarised in the second direction. The first image is displayed using the odd line pixels and the second image is displayed using the even line pixels.

Other examples include lenticular lens based displays which include an array of vertical lenticular lens which are arranged to project the two different images that comprise a 3D image at different display angles. By matching the display angles to the separation between a viewer's eyes, the viewer will see different images through each eye.

In another example a shutter lens system is used. A viewer is provided with a pair of "shutter glasses". The shutter glass comprise a standard spectacle arrangement except that where a pair of optical lenses are conventionally located, instead are a pair of shutters which are capable of very rapidly opening and closing to allow or restrict the transmission of light. Each shutter is typically implemented using a liquid crystal display lens which can be turned opaque by the application of a suitable voltage. The shutter glasses are synchronised to a display. The display shows a sequence of "left shutter frames" and "right shutter frames". During one video frame there is one complete cycle of one left shutter frame and one right shutter frame. When a "left shutter frame" is shown, a shutter in the right lens of the shutter glasses shuts and the viewer sees the screen only through his left eye. When a "right shutter frame" is shown, a shutter in the left lens of the shutter glasses shuts and the viewer sees the screen only through his right eye. Accordingly, the sequence of left shutter frames and right shutter frames can be used to allow the user to view different images though each eye.

The methods and systems explained in the following description are described mainly in terms of a shutter lens system. However, it will be appreciated that the systems and methods disclosed herein can be implemented using any of the above mentioned stereoscopic video systems. Specifically, all stereoscopic video systems include to some extent the concept of a "left frame" which is seen only by the left eye and a right frame that is only seen by the right eye.

FIG. 1 provides a schematic diagram illustrating a 3D video sequence 101 comprising a number of 3D video frames. Each 3D video frame 103 comprises one left shutter frame 102 and one right frame 104. As can be seen from FIG. 1 the left shutter frames and the right shutter frames are arranged alternately.

Figure 2:
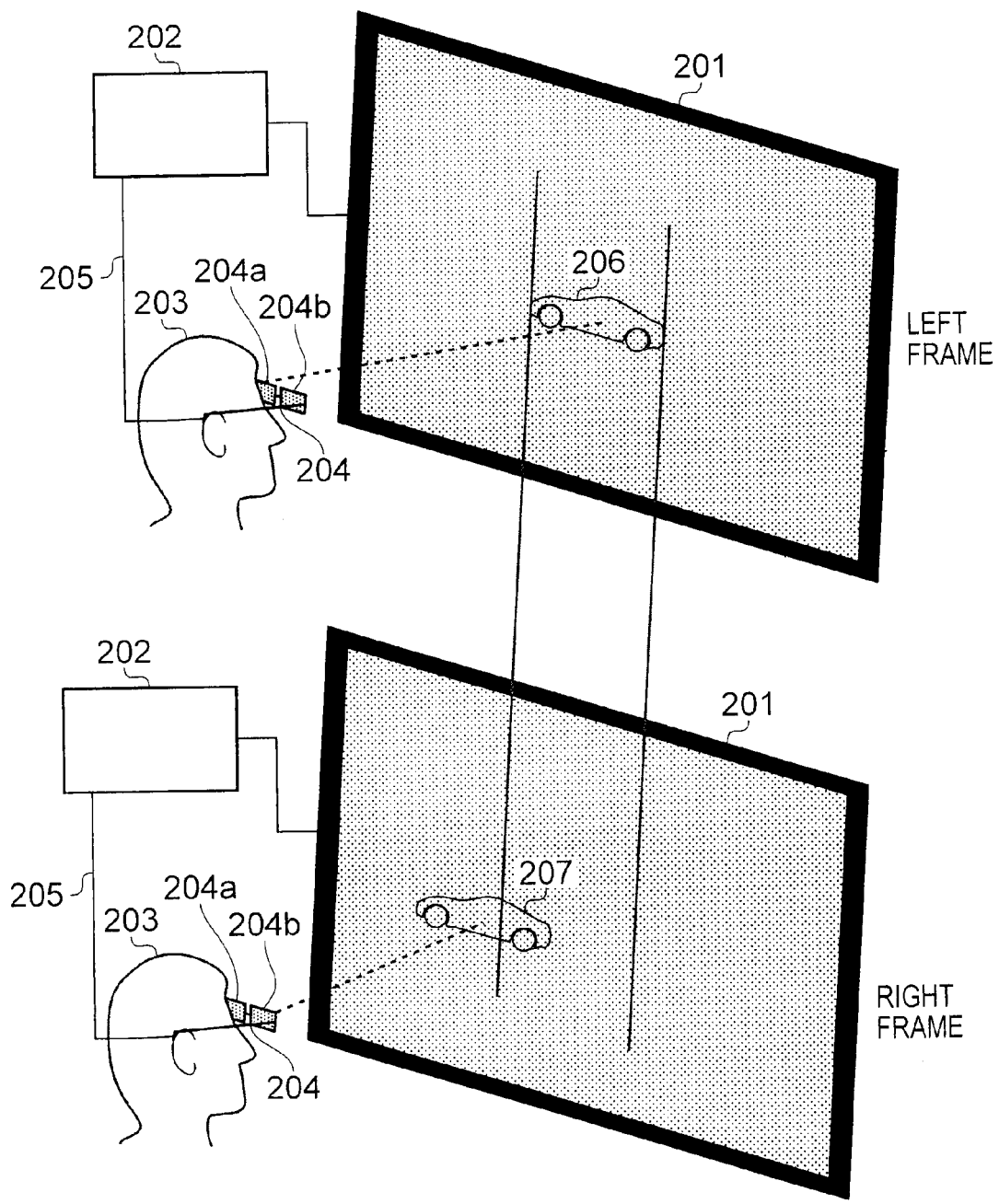
FIG. 2 provides a schematic diagram illustrating a system for displaying the 3D video sequence shown in FIG. 1.

FIG. 2 provides a schematic diagram illustrating a system for displaying the 3D video sequence shown in FIG. 1.

FIG. 2 shows a display 201, for example a conventional television, which is connected to a 3D video source 202 in which is stored the 3D video sequence shown in FIG. 1. The 3D video sequence stored in the 3D video source 202 is input to the display 201 and each 3D video frame from the 3D video sequence is sequentially displayed on the display 201. A viewer 203 is shown wearing a pair of shutter glasses 204. The shutter glasses 204 comprise a left shutter 204a and a right shutter 204b. The shutter glasses 204 are synchronised with the output of the 3D video sequence from the 3D video store 202 by means of a connection 205. The connection 205 may in some examples be a wireless connection or in other examples be a physical connection. The shutter glasses 204 are synchronised with the output of the 3D video sequence from the 3D video source 202 in that when the display 201 displays a left shutter frame the right shutter 204b of the shutter glasses 204 is shut so as to substantially prevent any light passing through the right shutter 204b. The effect of this is that the viewer 203 only sees the display 201 with his left eye. Accordingly, a first image 206 shown in the left shutter frame from the 3D video sequence is seen by the viewer only through his left eye. After the left shutter frame has been displayed the subsequent right shutter frame from the 3D video sequence is displayed. The synchronization between the shutter glasses 204 and the 3D video source 202 is such that when the right shutter frame is displayed the left shutter 204a of the shutter glasses 204 is shut so that the viewer 203 sees the display 201 through his right eye only. When the right shutter frame is displayed a second image 207 is displayed which corresponds to the first image 206 shown in the left shutter frame, however the second image 207 is horizontally displaced relative to the position of the first image 206. As will be appreciated, frames are displayed to the viewer 203 at such a rate that the viewer cannot detect that alternate images 206, 207 are being displayed. Instead, the viewer perceives the two images 206, 207 as a single image which has some degree of three dimensional "depth". This is explained further with reference to FIG. 3.

Figure 3:
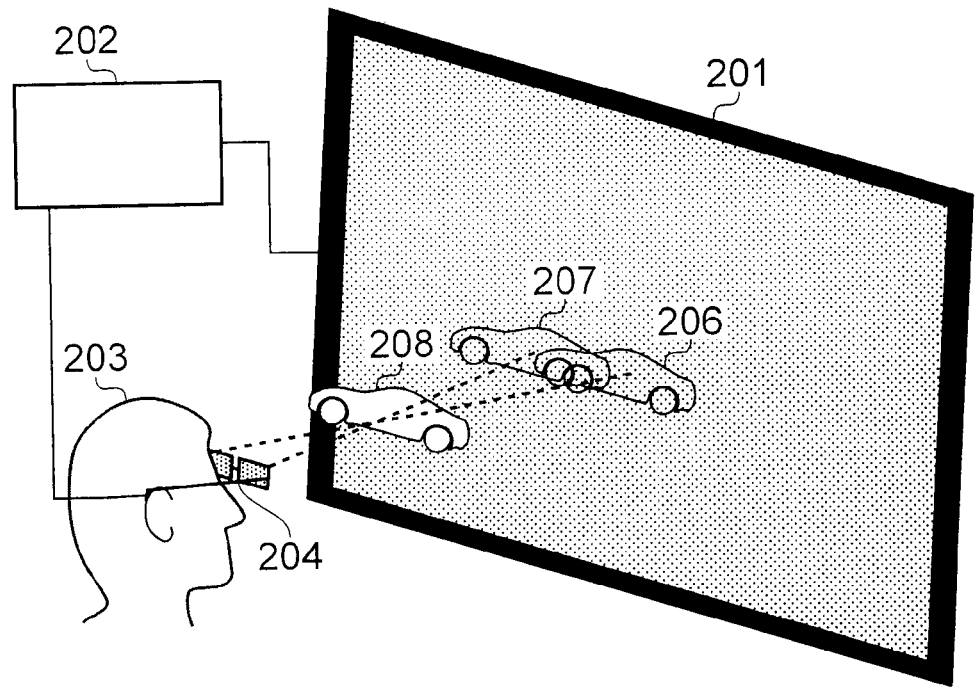
FIG. 3 provides a schematic diagram illustrating how the images displayed in the system of FIG. 2 can be seen by the viewer.

FIG. 3 shows a schematic diagram illustrating the system as shown in FIG. 2 except showing how the images on the display 201 are seen by the viewer 203. The viewer 203 sees the first image 206 through his left eye via the sequential opening and shutting of the left shutter of the shutter glasses 204, and sees the second image 207 through his right eye via the right shutter of the shutter glasses 204 opening and closing sequentially. The human brain will reconcile this information from the display by perceiving that there is a 3D image 208 which is positioned a distance in front of the display 201. 3D images positioned in front of a display in this manner are said to have had a "negative" parallax.

Figure 4:
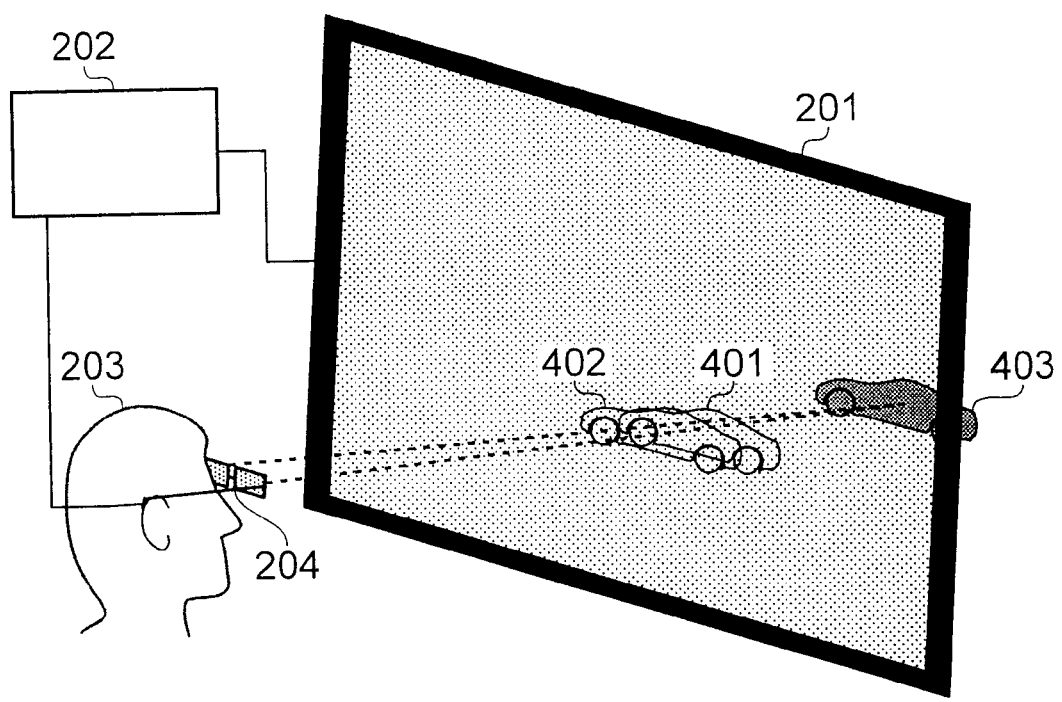
FIG. 4 provides a schematic diagram illustrating how the images displayed in the system of FIG. 2 can be seen by the viewer.

As will be appreciated, this technique can also be used to give a viewer the impression that a 3D image is positioned behind the screen. This is shown in FIG. 4. FIG. 4 shows a schematic diagram illustrating a first image 401 which a viewer 203 sees through his right eye and a second image 402 which a viewer 203 sees through his left eye. As can be seen from FIG. 4 this gives the viewer 203 the impression that a 3D image 403 is positioned behind the screen 201.

Reduction in Discomfort due to Cutting from Images Perceived on one Image Plane to Images Perceived to be on a Second, Different, Image Plane (such as 2D)

Figure 5:
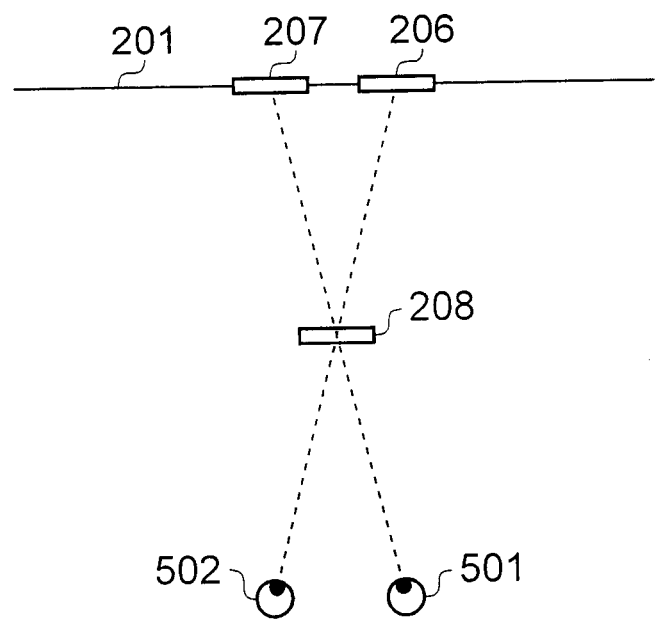
FIGS. 5 and 6 provide a schematic diagram illustrating a top down version of the display shown in FIGS. 2 and 3.

In video sequences displayed to a viewer as illustrated in FIGS. 2 to 4, a problem may arise due to the 3D video sequence cutting abruptly from displaying a 3D image (i.e. an image generated by showing a first image to the viewer's right eye and a horizontally offset second image to the viewer's left eye) to an image on a different plane (for example a 2D image displayed on the screen which the viewer sees through both eyes or an image having a different 3D effect). This concept is illustrated with reference to FIG. 5 and FIG. 6. FIG. 5 shows a schematic diagram illustrating a top down version of the display 201 shown in FIG. 2 and FIG. 3 showing the first image 206 and the second image 207 which are viewed respectively by the viewer's right eye 501 and the viewer's left eye 502 which thereby cause the viewer to perceive the 3D image 208.

Figure 6:
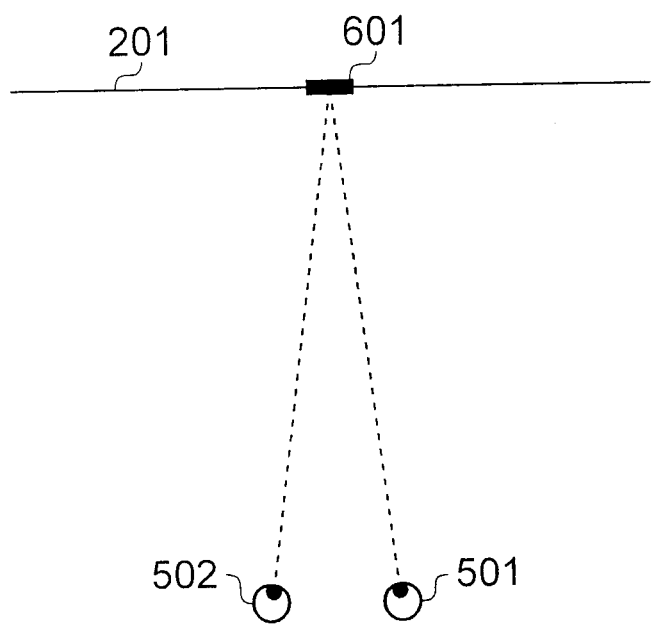

FIG. 6 shows a top down view of the display 201, as in FIG. 5, except this time a subsequent frame of the 3D video sequence is shown whereby the 3D image 208 has been replaced by, in this example, a 2D image 601 which the viewer sees with both eyes. As can be seen by comparing FIG. 6 with FIG. 5, when the display 201 abruptly changes from displaying the 3D image 208 to displaying the 2D image 601 the direction of the viewer's eyes has to abruptly change to focus on the 2D image 601. If a 3D video sequence includes a number of abrupt cuts between displaying a 3D image to displaying a 2D image and vice versa the fact a viewer has to quickly change the direction their eyes are pointing in can lead to significant discomfort.

FIGS. 7a to 7d provide schematic diagrams illustrating a technique for reducing viewer discomfort according to an embodiment of the invention.

Figure 7A:
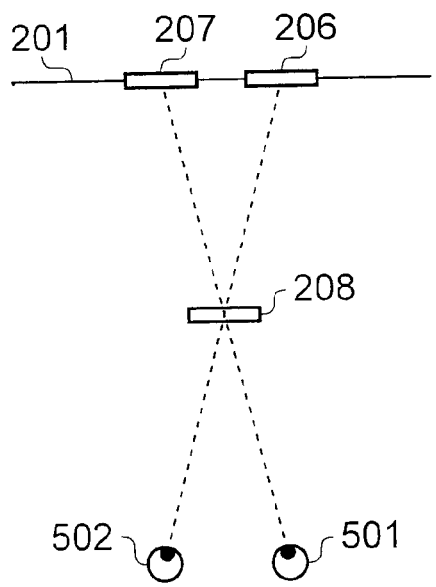
FIGS. 7a to 7d provide schematic diagrams illustrating a technique for reducing viewer discomfort according to an embodiment of the invention.
Figure 7B:
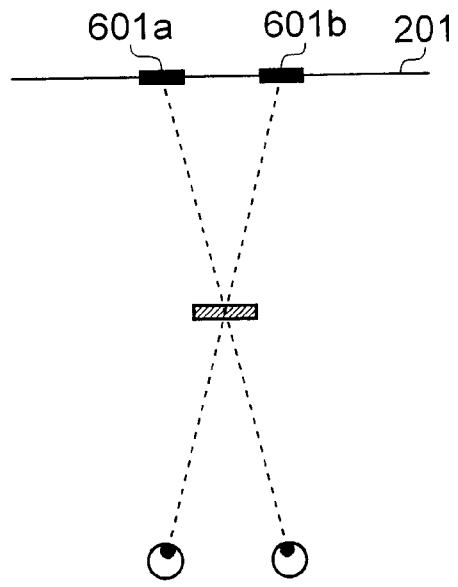
Figure 7C:
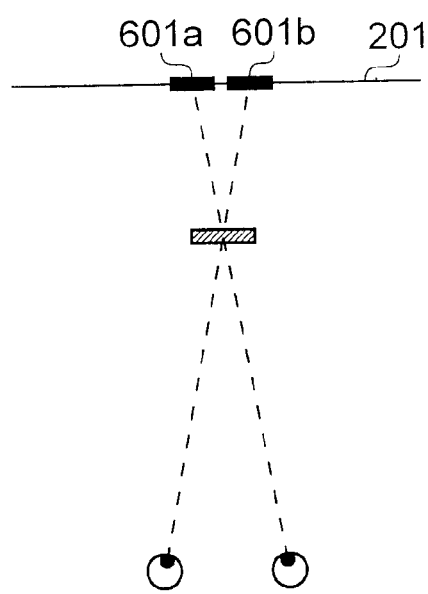
Figure 7D:
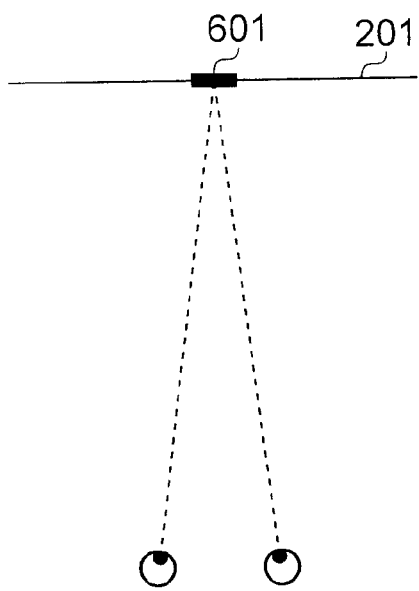

FIG. 7a shows two images 206, 207 provided by a sequence of 3D video sequence frames which a viewer perceives as a 3D image 208 displayed on a image plane (201) (e.g. a display). In other words, image 206 is displayed during the left shutter frame and image 207 is displayed during the right shutter frame. FIG. 7b shows the next video frame of the 3D video sequence in which there is a cut from the 3D video image 208 to a 2D image 601. However, as can be seen from FIG. 7b two copies of the 2D image 601 are provided on the screen 201 a first copy 601a and a second copy 601b. The first and second copies of the two dimensional image are at positions which correspond to the positions of the first image 206 and second image 207 which comprise the 3D image 208. FIG. 7c shows a next frame of the video sequence which shows the first copy of the 2D image 601a and the second copy of the 2D image 601b converging together. FIG. 7d shows a frame of the 3D video sequence after that shown in FIG. 7c in which the first and second copies of the 2D image have converged on a single point on the screen 201 providing a single representation of the 2D image 601. This single point corresponds to the position at which the 2D image is to be displayed to the viewer in the image plane.

Therefore, over a short period of time, the 2D image is displayed stereoscopically (so will have a slight 3D effect). As the 2D image gradually converges on the screen towards the single point, the 3D effect will decrease until, towards or at the single point, the image will become almost 2D or exactly 2D. In fact, it is possible, when almost (or indeed) fully converged to switch the shutter glasses off thus making both lenses in the glasses transparent. At this point, the single 2D image can then be displayed. It would be possible to display just the 2D image just before there is full convergence because the transition on the eye would not be so large.

As will be understood, by employing this technique rather than the viewer being forced to abruptly shift the direction of their eyes from two displaced images to a single image, the viewer's eyes are more gradually guided to the eventual point where the 2D image is to be displayed. This technique can be applied over a small number of frames, for example 12, such that the convergence of the two copies of the 2D image on the single point on the display 201 are of reduced perceptibility to the viewer. In fact, in reality, the number of frames which will be unperceivable to the user would be likely to be higher than 12 as it is difficult for the viewer to perceive a 2D image in the 3D space. Further, the convergence of the 2D to the single point can be controlled to be either unperceivable or perceivable to the viewer. By making the transition perceivable to the user, a useful editing effect can be achieved. In fact, the transition can be made over any number of frames which reduces the effect on the viewer of their eyes moving from viewing a 3D image to a 2D image So, in the case of the transition being unperceivable to the viewer although the viewer will not perceive that for a short period of time the 2D image was displayed stereoscopically on the display (and so therefore does not perceive the 2D image having a 3D effect), their eyes will nevertheless be guided gradually to the position of the 2D image on the display 201.

Figure 8:
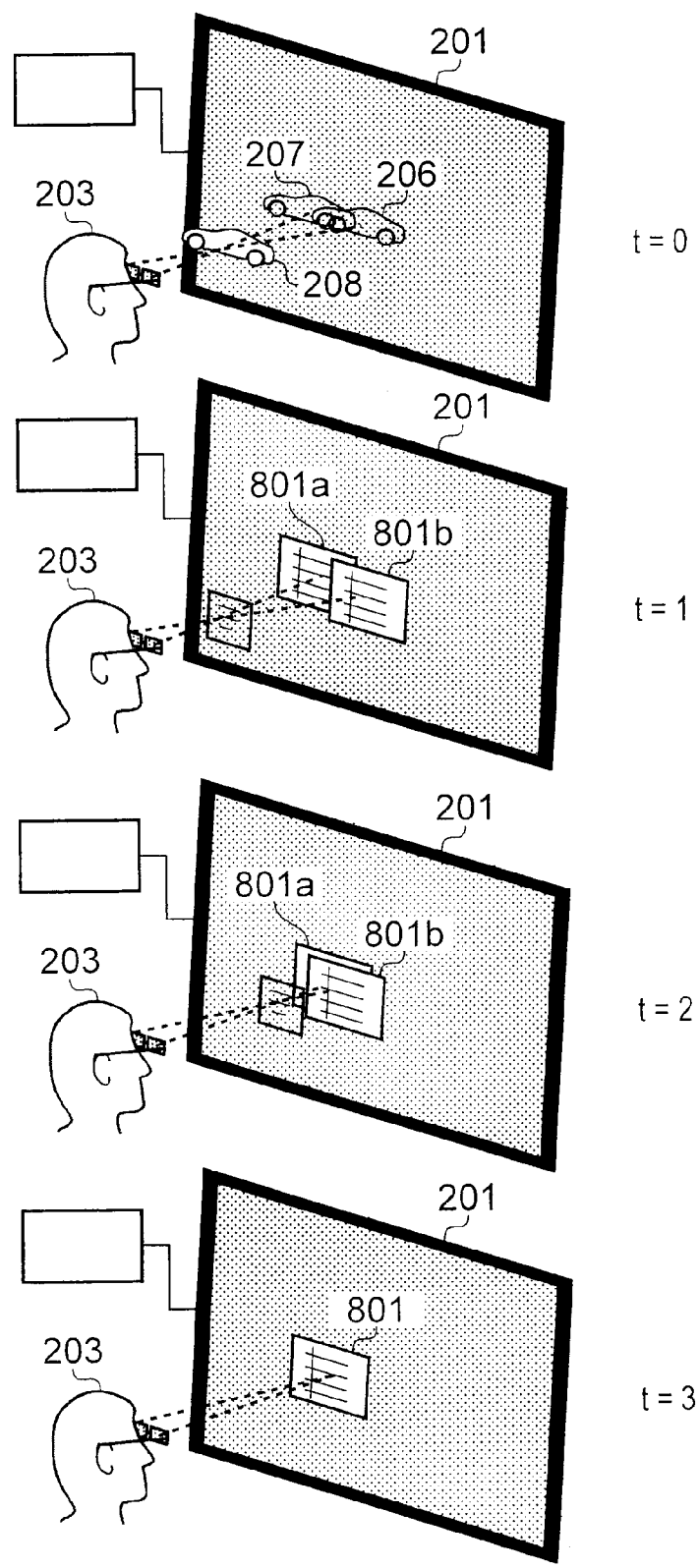
FIG. 8 provides a schematic diagram illustrating an example of the technique shown in FIGS. 7a to 7d.

FIG. 8 shows a schematic diagram illustrating an example of this technique. FIG. 8 shows the display 201 shown in FIGS. 2 and 3. As can be seen from FIG. 8, at t=0 the viewer perceives the 3D image 208 on the screen 201. At t=1, two copies of a 2D image 801a, 801b are displayed on the screen 201 at positions formally occupied by the first image 206 and second image 207. This has the effect of the 2D object appearing in 3D space for a short period. At time t=2 the two copies of the 2D image 801a and 801b can be seen to converging towards a single point on the display 201. This makes the position of the 2D object appear closer to the screen. At t=3 a single 2D image 801 is displayed at the point at which the two copies of the 2D image converge.

The rate at which the image converges to be a 2D image can be controlled. For example, the convergence of the images during the transition can be constant (i.e. the rate at which the 2D images converge is constant). Alternatively, the convergence of the images at the start of the transition can be quicker than at the end of the transition (i.e. the rate at which the 2D images converge at the start of the transition is quicker than at the end of the transition). Alternatively, the convergence of the images at the end of the transition can be quicker than at the start of the transition (i.e. the rate at which the 2D images converge at the end of the transition is quicker than at the start of the transition). This may be advantageous especially where the transition is perceivable because this may produce a useful editing tool. However, even in the case of unperceivable transitions, by having different transition rates may further reduce the adverse effects on the viewer's eyes. For example, where the viewer's eyes are at their most diverged (i.e. at the start of the transition), it may be useful to commence a slow transistion. This will have less impact on the viewer's eyes when they are at their most unnatural position. However, as the viewer's eyes become less diverged during the transition, the rate of convergence can increase as the impact on the viewer's eyes is less.

Moreover, although the above describes the number of frames as being one influence on the perceptibility of the transition, other influences also exist. For example, the perceived depth of the object when moving from the 3D plane to the 2D plane may also influence the perceptibility of the transition.

Figure 9:
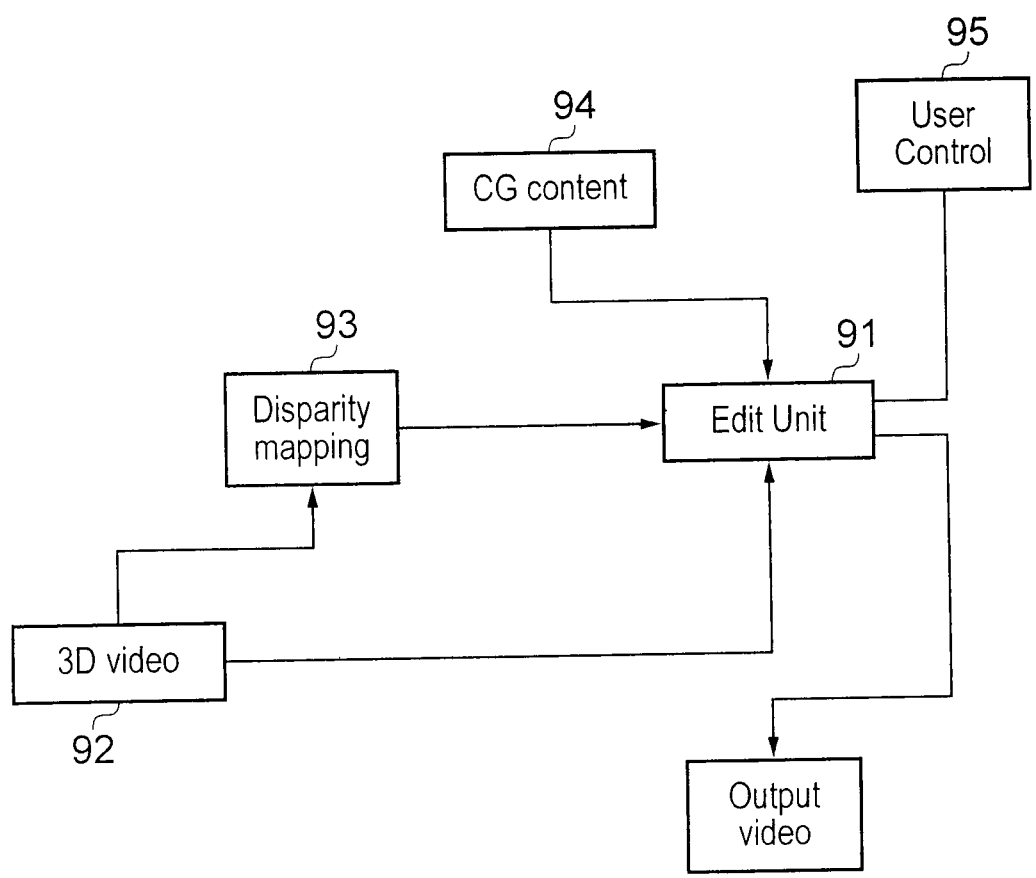
FIG. 9 provides a schematic diagram illustrating a system for implementing the technique shown in FIGS. 7a to 7d.

FIG. 9 shows a schematic diagram illustrating a system for implementing the technique shown in FIGS. 7a to 7d and in FIG. 8. The system shown in FIG. 9 may be implemented as part of a video editing suite such as those known in the art that are used to edit live or pre-recorded video content.

FIG. 9 includes an edit unit 91 for performing conventional video editing functions such as editing together different frames of video to produce an output video sequence, and for applying various effects to a video sequence. The edit unit 91 may be controlled by a user using a user control 95. A video sequence source 92 such a live feed from television cameras or a video sequence being read from some form of storage media is sent to the edit unit 91. In the example shown in FIG. 9 the video sequence from the video source 92 is a 3D video sequence. The edit unit 91 also receives video content from a second video source 94. In some examples this may be computer generated content, in particular 2D computer generated content such as logos and/or supplementary information to be inserted into a video sequence. The system includes a disparity mapping unit 93 into which the 3D video sequence from the video source 92 is also input. The disparity mapping unit 93 is arranged to compare left shutter frames and right shutter frames of the 3D video sequence to determine a disparity between the images displayed therein. For example, with reference to FIG. 2 it can be seen that a left shutter frame and right shutter frame of a 3D video sequence display substantially the same image except that these images are displaced horizontally from one another. The disparity mapping unit 93 is arranged to detect this horizontal displacement (i.e. disparity) and pass this information to the edit unit 91. The disparity is the number of pixels difference between corresponding pixels in the left and right image. The disparity map can be used to generate a depth which maps the disparity at any point to a point in real space using camera parameters. Accordingly, using the disparity mapping information provided from the disparity mapping unit 93, the edit unit can keep track of the position of the image in the left shutter frame and the position of the image in the right shutter frame which combine together to make the 3D image. The disparity mapping information may be stereoscopic metadata provided in signal form. This mapping information may be produced by a camera capturing the image. The stereoscopic metadata may be stored in association with the captured images. This disparity mapping information allows the edit unit to insert the two copies of the 2D image at positions which correspond to the positions of the previously displayed first and second image in order to perform the technique described above. The function of the disparity map generator is explained in further detail below.

It should be noted here that the foregoing has been described with reference to 3D to 2D cutting. However, the invention is not so limited. In embodiments of the present invention, this handover technique can be equally applied to 3D to 3D transitions. For example, if there is a cut from a piece of 3D footage where an object is visualised in front of the screen to a piece of 3D footage where an object is visualised behind the screen, the discomfort may still exist. Therefore, the handover technique described above is useful for any situation where the object is moved from being visualised in one image plane to another, different, image plane.

2D Image Object Insertion

Figure 10:
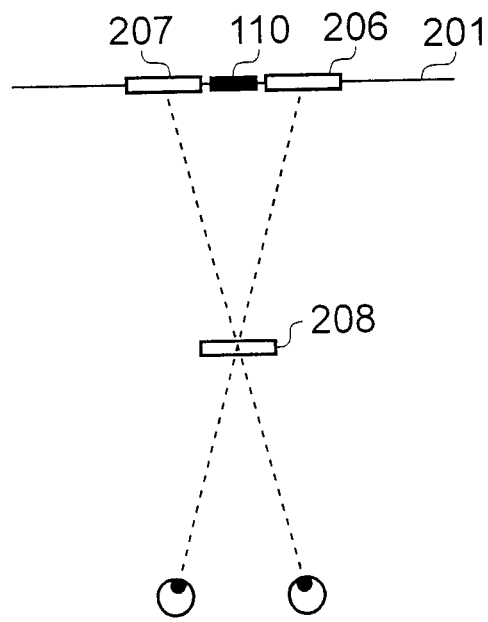
FIG. 10 provides a schematic diagram illustrating an example of a 2D image being inserted into a 3D video sequence.

In some situations, it may be desirable to insert a 2D image of an object (i.e. an image object) into a 3D video sequence. For example, if showing a live sporting event such as a motor racing event, it may be desirable to insert computer generated graphics into the 3D video footage showing the racing cars to provide the viewer with further information regarding the motor race. Such information may be a caption or a subtitle, or indeed a number as in FIG. 10. FIG. 10 shows a schematic diagram illustrating an example of a 2D image being inserted into a 3D video sequence.

Figure 11:
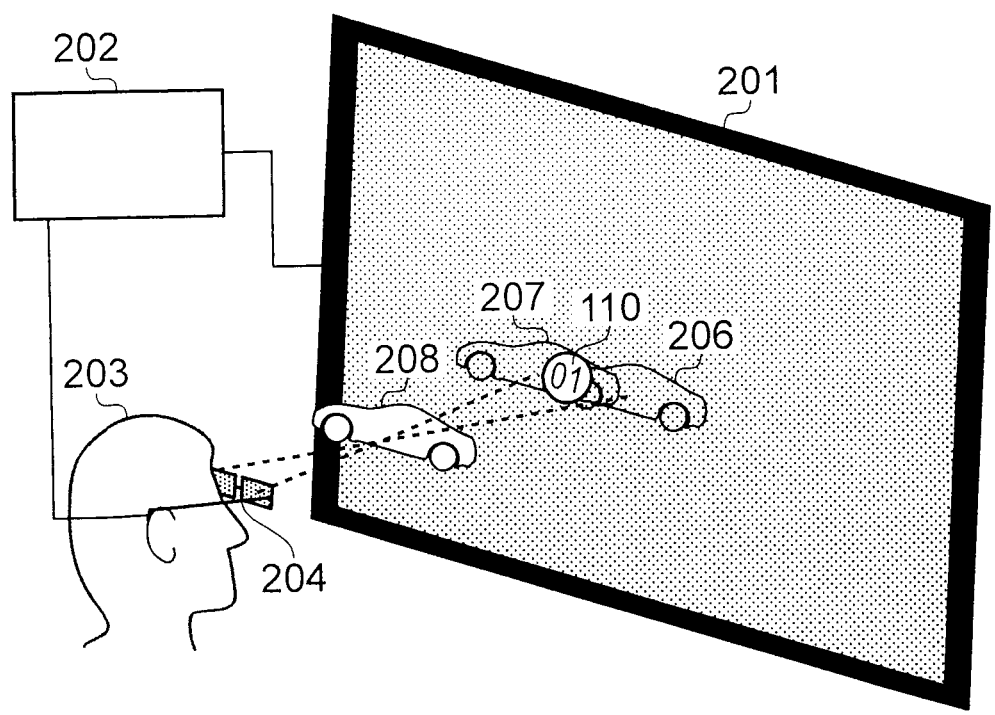
FIG. 11 provides a schematic diagram illustrating the positioning of a 2D image on a screen.

As can be seen from FIG. 10, the first image 206 is shown to a viewer's left eye and the second image 207 is shown to a viewer's right eye forming a 3D image 208 which in this example is a racing car. FIG. 10 shows the insertion of a 2D image such as a computer generated graphic such as a number. Although this number is supplemental to the 3D image and so is inserted on the screen 201 in a position which is different to the first and second image, the positioning of the 2D image 10 between the first image 206 and second image 207 may lead to the breakdown of the illusion of depth of the 3D image 208. This is shown more clearly in FIG. 11 which provides a schematic diagram illustrating the positioning of the 2D image 110 on the screen 201 at a position between the first image 206 and the second image 207. The viewer can see the 2D image 110 through both left and right eyes but this positioning makes no sense from the viewer's perspective as it is behind a position where the viewer perceives the 3D image 208 to be positioned in front of the screen.

In order to address the problem the 2D image should be inserted onto the screen in a more appropriate location. Specifically, the location should not be affected by the 3D illusion or it should be placed on the screen at a position which would be in front of the object which in the 3D illusion is closest to the viewer. In order to determine this information, the disparity map is used.

This technique of identifying areas where the 2D image can be inserted is implemented by the system shown in FIG. 9 by using the information from the disparity mapping unit 93 to determine the relative positions of the first and second image that go to make up the 3D image from the frames of the 3D video sequence, whilst inserting 2D computer generated content from the second video source 94 using the edit unit 91.

Moreover, for live content, it can not be guaranteed that a previously 'safe' position on the screen or in 3D space will remain so. For example, someone may walk in front of the camera, or run towards the camera. In these cases it is desirable to either automatically remove the graphics when the object moves in front of them, or to remove the portion of the graphics that is being occluded by the object. In the former case, it is possible to obtain this information from the disparity map as determined in embodiments of the present invention. However, in the second case, it would be necessary to generate a dense disparity map having depth information for each pixel. Such a map may be generated using any known technique such as that explained with reference to FIG. 12 as would be appreciated by the skilled person.

Disparity Map Generation

Figure 12:
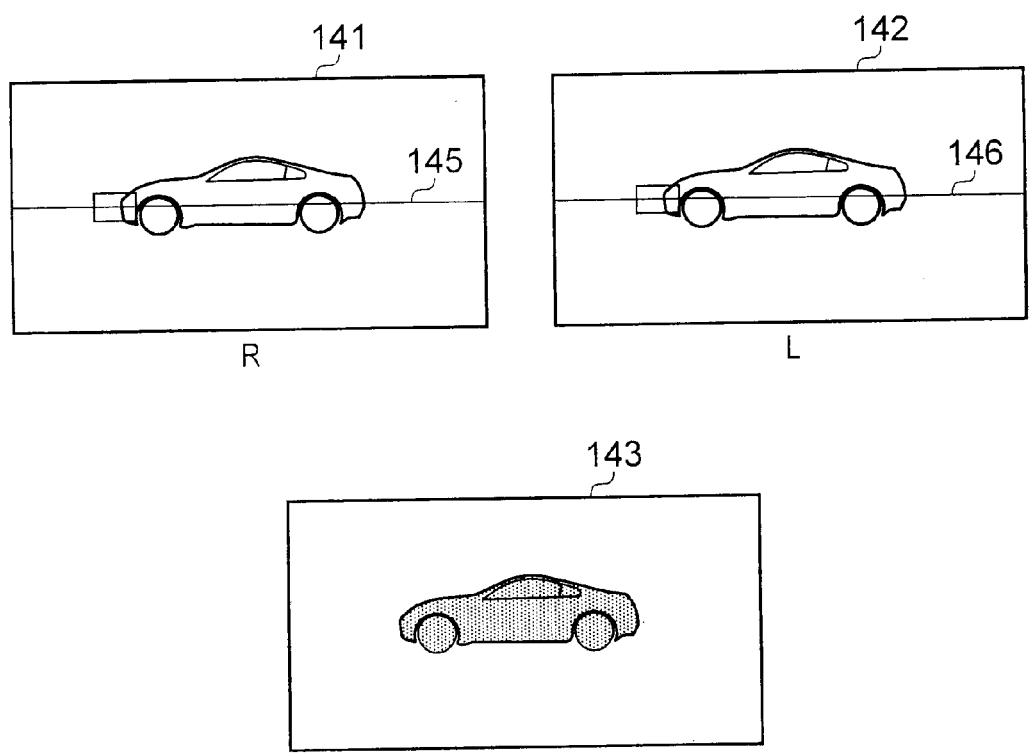
FIG. 12 provides a schematic diagram illustrating how a left shutter frame and a right shutter frame of a 3D video sequence are compared to generate a disparity map in a conventional manner.

FIG. 12 provides a schematic diagram illustrating a conventional technique of generating a disparity map by comparing a left shutter frame 141 and a right shutter frame 142 of a 3D video sequence. The right shutter frame 141 and the left shutter frame 142 are aligned and then, pixel by pixel, each point from each frame is compared with corresponding points from the other frame to identify the horizontal displacement of the pixels (i.e. disparity) between the frames. This information can then be graphed onto a two dimensional map 143 which shows graphically regions where the pixels from one frame are horizontally displaced from pixels from the other frame. In some examples, darker areas on the two dimensional map may be used to indicate a greater level of disparity.

Using this conventional technique each line 145 of the right shutter frame is compared with the corresponding line 146 of the left shutter frame on a pixel by pixel basis to determine the disparity of points on that line. Because this is done on a pixel by pixel basis, although generating a very detailed disparity map 143, it is computationally very intensive and may take a great deal of time. For high definition images that may make up the frames of a 3D video sequence, it may be impractical to generate a disparity map in real time or near real time.

Figure 13:
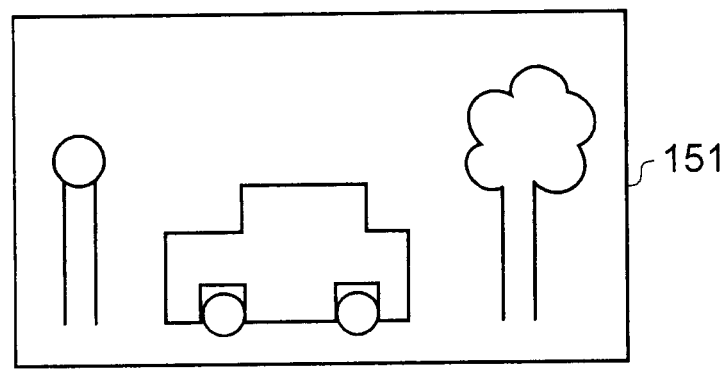
FIG. 13 provides a schematic diagram illustrating an example of an improved technique for increasing the speed and efficiency with which a disparity map is generated.
Figure 13:
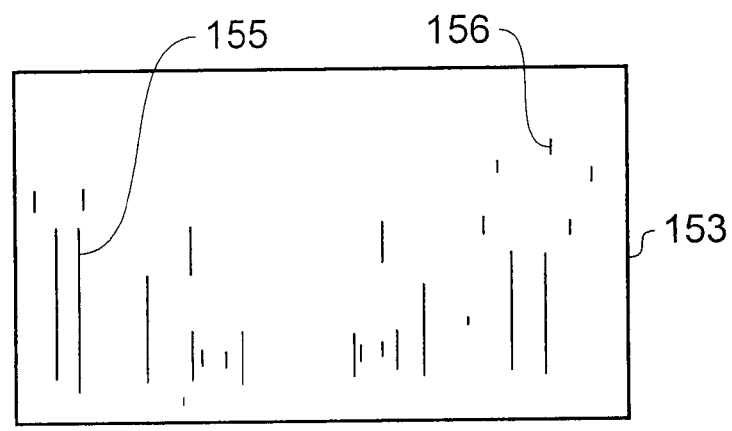
Figure 13:
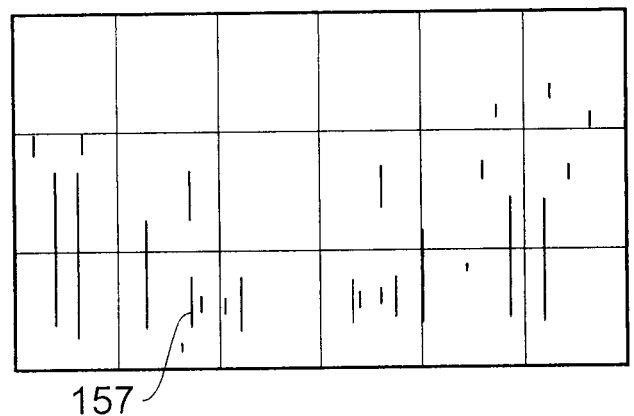

FIG. 13 provides a schematic diagram illustrating an example of an improved technique for increasing the speed and efficiency with which a disparity map of a video sequence is generated.

Firstly, a left shutter frame 151 undergoes an edge detection process. However, equally, a right shutter frame may be used instead for edge detection processing. This edge detection process may be undertaken by using conventional edge detection algorithms such as a Sobel edge detection process. Indeed, it is useful to use the Sobel edge detection technique as only vertical edges at detected in the images. Vertical edges are detected because, in embodiments, only horizontal disparity is determined. Therefore, by detecting only vertical edges, the number of candidate key features is reduced. This reduces computational expense. However, the invention is not so limited and other edge detection processes are envisaged, as is the detection of edges in any direction. After edge detection has been performed, an edge detection image 153 showing the edge pixels detected from the left shutter frame is generated. As can be seen, the first image 153 contains a number of superfluous edge pixels 155, 156 which do not correspond to the main object 157 in the left shutter frame from the 3D video sequence.

Accordingly, a second stage of edge detection is undertaken whereby the first image 153 is broken down into smaller pixel blocks for example 8 by 8 pixel blocks or 16 by 16 pixel blocks (or indeed any size pixel blocks) and the number of edge pixels present in these blocks is analysed. If the number of edge pixels in each block is below a threshold value then that block is assumed to contain no edge pixels. In embodiments, the threshold of the block is the same as the block width and height. This is because a vertical line that crosses the block will have at least that number of pixels in it. However, the invention is not so limited and any threshold value is anticipated such as 5. Accordingly, superfluous edge pixels which arise due to objects from the frames in the background which are not relevant for generating disparity map tend to be excluded. In some situations there may be many edge pixels in a pixel block. For this reason, a maximum number of edge pixels may be set, for example 12 and if the number of edge pixels in a pixel block exceeds this value then a predefined number of edge pixels from that block are randomly picked, for example 8, and these edge pixels are assumed to be the edge pixels of that block. This is a convenient way of increasing the speed of this technique.

After the second stage of edge pixel detection one or more key feature is selected. The key feature is a pixel taken from the detected edges in the pixel blocks. The selection is, in embodiments, a random selection from the edge pixels contained in the pixel block which is assumed to contain edge pixels, although other non-random selections are possible. Alternatively, each edge pixel in the pixel block may be a key feature. After selection of the key feature from each pixel block, a second block in which the key feature is located in the left hand shutter frame is generated. This other block is, for example, 16 pixels by 16 pixels and is centred on the key feature pixel. It is envisaged that the other block can be any size. This means that the key feature pixels in the right hand image are selected from the pixel blocks having edge detected pixels.

In the right shutter frame (where the left shutter frame had edge detection processing thereon), a search area is determined. This search area has the key pixel at its centre and is typically 201 pixels wide and 11 pixels high. In other words, the starting point for the search area in the right hand image is at the pixel position of the key feature in the left hand image. It should be noted here that any size search area may be used and that the size of the search area depends upon the expected maximum horizontal and vertical parallax expected between the left shutter frame and the right shutter frame. A 201 pixel wide search area allows a horizontal parallax in the range −100 pixels to +100 pixels and an 11 pixel high search area allows a vertical parallax in the range −5 pixels to +5 pixels. If the range of expected parallaxes is known then the search area size can be adjusted accordingly. The 16 by 16 block from the left shutter frame is then 'matched' with the search area in the right shutter frame by comparing the 16 by 16 block to each pixel position in the search area using a conventional block matching technique. The comparison is done by correlating the example block with all the search blocks in the search area. The search block with the highest correlation becomes the best match. Vertical and horizontal disparity values are calculated by comparing the key feature pixel positions in the left shutter frame with the best match pixel position in the right shutter frame. After the search block for one key feature pixel is determined, the process is repeated for all key feature pixels.

It is useful to calculate both horizontal and vertical parallax because this technique is robust to 3D camera rigs that are not correctly aligned in the vertical direction. Moreover, by determining the vertical parallax, it is possible to correct for such errors.

As will be appreciated, by only using edge pixels in the disparity mapping process to generate the key features, a disparity map is generated much more quickly and efficiently than would otherwise have been the case if a disparity map was generated on a pixel by pixel basis for the left shutter frame 151 and right shutter frame 152 of the 3D video sequence without any further processing.

This technique can be further improved to ensure that the number of errors in disparity estimates is reduced. In order to validate the disparity result, once block matching has taken place, edge detection on the right image takes place. As the positions of edges in the left hand image has been determined, and the disparity calculated, it is possible to identify which pixel positions within the right hand image should be edge pixels. A comparison is then made between where the edge pixels in the right hand image should be located (if the disparity is correct) and whether and there is an edge pixel located at that pixel position in the right hand image. The disparity result is validated if the best match pixel in the right image is located on or near to an edge in the right image. The term "near" may mean within one pixel, although any number of pixels may be envisaged.

Figure 14:
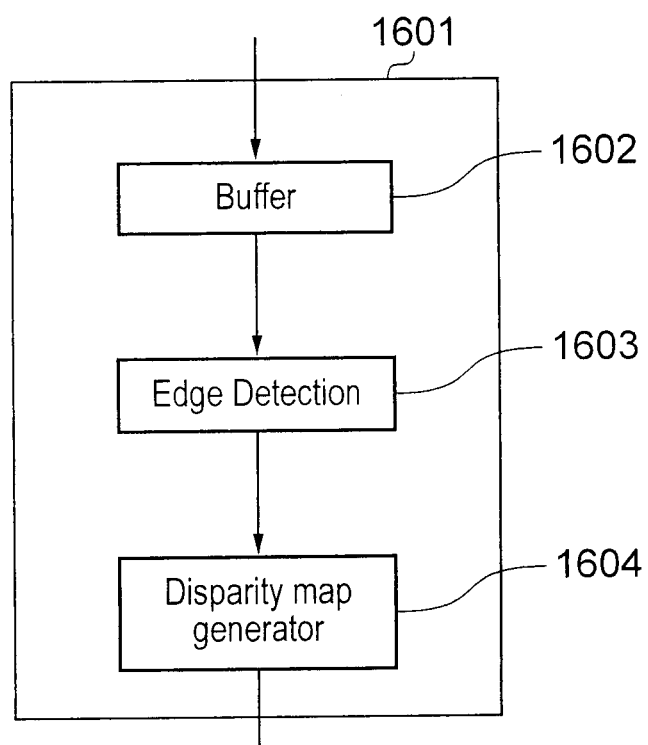
FIG. 14 provides a schematic diagram illustrating a disparity mapping unit.

FIG. 14 shows a schematic diagram illustrating a disparity mapping unit, for example like the one shown in FIG. 9, which can be arranged to implement the method illustrated in FIG. 13.

FIG. 14 shows a disparity mapping unit 1601 which includes a buffer 1602 and edge detection unit 1603 and a disparity map generator 1604. A first frame of 3D video sequence is input to the buffer 1602 which is then passed to the edge detection unit 1603 which undertakes the edge detection processes shown in FIG. 15. The edge detection information is then passed to a disparity map generator 1604 where the disparity is determined. The disparity map generator 1604 outputs the disparity map as metadata.

Depth Budget Detection

As will be appreciated with reference to FIG. 3, a 3D image may be arranged on a display so as to appear to be at a position in front of that the display. Moreover, the further a 3D image is from the screen and the nearer the 3D image to the viewer, the greater the horizontal displacement (i.e. disparity) between the two images which make up the 3D image.

Figure 15A:
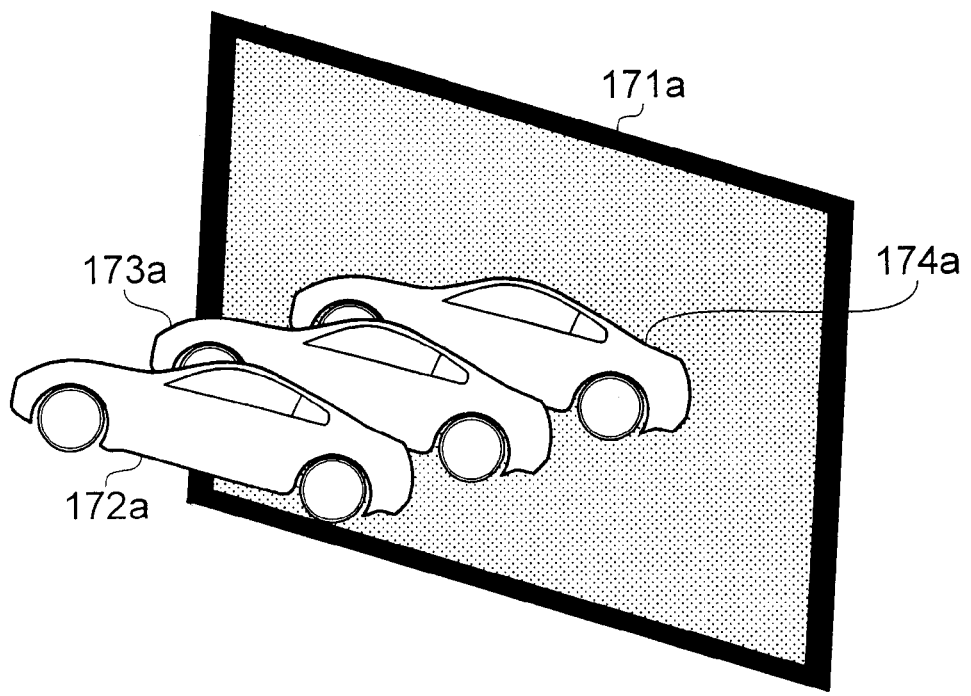
FIG. 15a provides a schematic diagram illustrating a scene from a 3D video sequence.
Figure 15B:
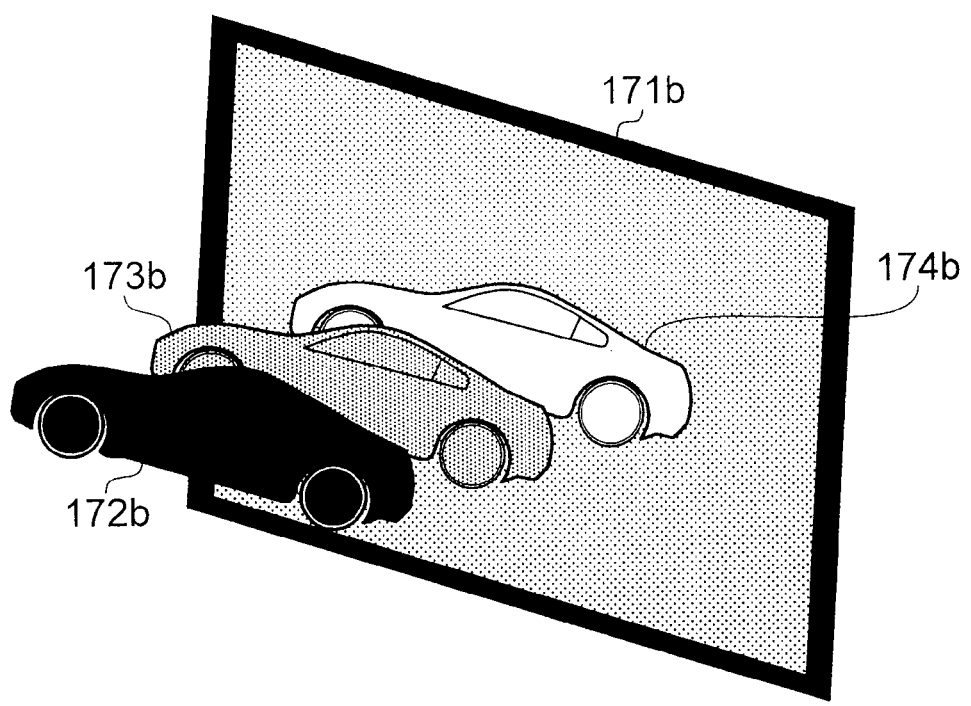
FIG. 15b provides a schematic diagram illustrating a technique for showing a scene from a 3D video sequence.

Accordingly, in order to give the impression that a 3D image is very close to the viewer it is necessary to have the two images which make up the 3D image spaced quite far apart. As will be appreciated, if the distance between the two images which make up the 3D image is too great this will become either uncomfortable or impossible for a viewer to reconcile as after a certain point a viewer will be unable to simultaneously direct their eyes at two images that are substantially displaced from each other. Therefore, a "depth budget" may be set which defines a maximum negative or positive parallax that a 3D image may have before it is deemed to become too uncomfortable for a viewer to view the 3D image. Whether or not a 3D image exceeds this depth budget is information that will be useful to an editor compiling a 3D video sequence. FIGS. 15a and 15b illustrate a technique for making this information available to a 3D video sequence editor.

In one example a technique is provided for clearly and conveniently indicating to a viewer, for example a user who is editing 3D video footage, which three dimensional images are positioned at a negative parallax which is near to or exceeds the depth budget. FIG. 15a shows a schematic diagram illustrating a scene 171a from a 3D video sequence containing a first image 172a which has a very high negative parallax, a second image 173a which has a medium negative parallax and a third image 174a which has negligible negative parallax.

In accordance with this technique, 3D images which are displayed in a 3D video sequence frame which are either at or exceed the depth budget are given a colour to indicate to a 3D video sequence editor that that particular 3D image has exceeded the depth budget. FIG. 15b shows a schematic diagram illustrating a second scene 171b from a 3D video sequence in which the various 3D images have been coloured to indicate their relative parallax in relation to the depth budget. In particular, the first 3D image 172b has been attributed a dark colour to indicate that it is at or has exceeded the depth budget. A second image 173b is given a medium dark colour to indicate that it is near to exceeding the 3D depth budget and a third 3D image 174b is given a light colour to indicate that it does not exceed the depth budget.

As will be appreciated, different techniques could be used to indicate how close a 3D object is to exceeding the depth budget. For example, if a 3D object is within 10% of the maximum positive parallax permitted by the depth budget the 3D object could be given a light red colour. If a 3D object is at a positive parallax which is at or exceeds the depth budget it could be given a bright red colour.

Figure 16:
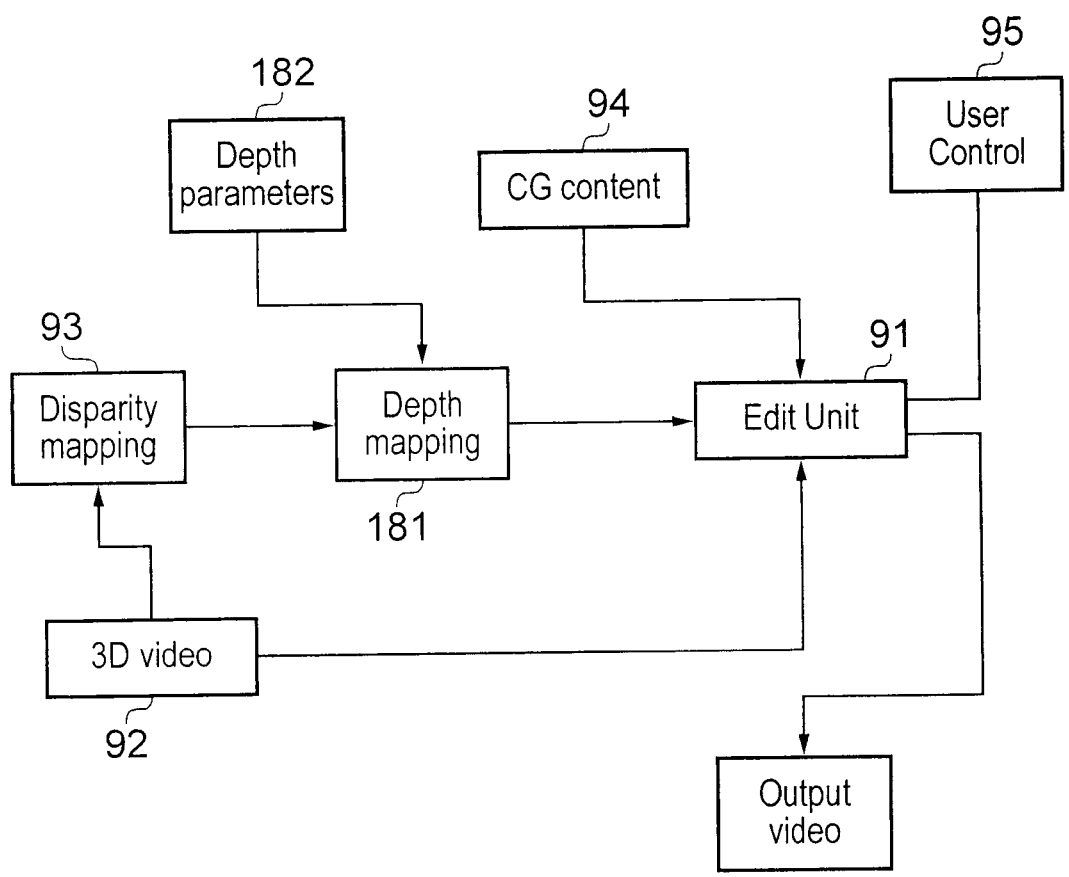
FIG. 16 provides a schematic diagram illustrating a system for carrying out the technique illustrated in FIG. 15b.

FIG. 16 shows a schematic diagram illustrating a system for carrying out the technique illustrated in FIG. 15b. As can be seen from FIG. 16, the system comprises the same parts as the system shown in FIG. 9, therefore like parts will not be explained again. However, the system shown in FIG. 16 includes as depth mapping unit 181 and a depth parameter unit 182.

As described above, the disparity mapping unit 93 provides a disparity map which indicates the horizontal displacement between images from the left shutter frame and the right shutter frame of the 3D video sequence. From the disparity map, it is possible to determine whether positive or negative parallax is present. This is because when the depth map is created, it is possible to determine whether or not the pixel in the left image is located to the left or right of the same pixel in the right hand image. If the pixel is to the right, then there is negative parallax. However, if the pixels is to the left, then there is positive parallax. Accordingly, the system of FIG. 16 includes the depth mapping unit 181 which takes the disparity map from the disparity unit 93 and applies to this depth parameters provided by the depth parameter unit 182. The depth parameters provide another source of information indicating the relative depth of the objects from the 3D video sequence. The depth parameters may be provided by a number of different means. For example, if the 3D video sequence has been captured by conventional television cameras, metadata associated with the focal length of the lens of the television cameras used during the capturing of that particular frame can be used to determine the relative position of the 3D image in question. This information can be stored as metadata in the depth parameter unit 182 and supplied to the depth mapping unit 66 as appropriate. In another example, the depth parameters may have been generated manually simply by an observer viewing the 3D video sequence and attributing to each 3D image a certain depth. In any case, depth mapping unit 181 combines the depth parameters provided by depth parameter unit 182 with the disparity map provided by disparity mapping unit 93 to provide a complete depth map indicating the relative depths of the objects within the 3D video frame. This information is then passed to the edit unit 91 which then determines if the 3D images present in the 3D video sequence are at or exceed the depth budget and if so, apply some kind of graphical indicator to the relevant 3D object as described above with reference to FIG. 15b. It will be appreciated that it is also possible to determine whether or not a depth budget has been exceeded simply by looking at disparity from the disparity map.

Aliasing Reduction Technique

In some situations, when two frames from a 3D video sequence undergo disparity mapping, the disparity mapping process may be affected by aliasing between the left shutter frame and the right shutter frame. This is illustrated in FIG. 17.

Figure 17:
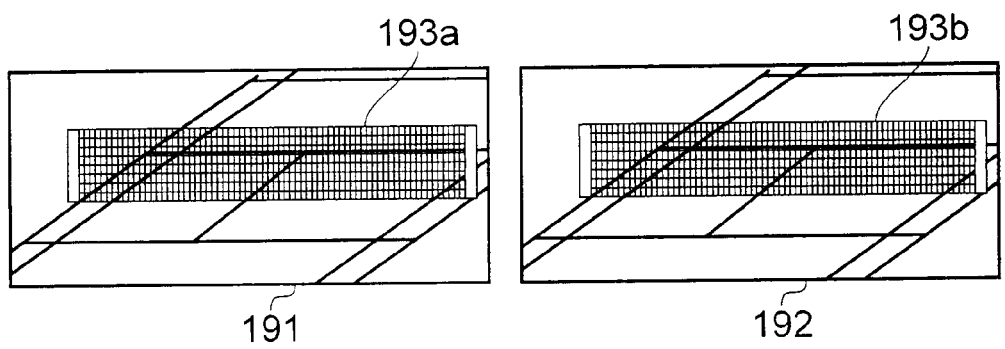
FIG. 17 provides a schematic diagram illustrating an example of a right shutter frame and left shutter frame from a 3D video sequence.

FIG. 17 shows a schematic diagram illustrating an example of a right shutter frame 192 and left shutter frame 191 from a 3D video sequence which show a scene of a tennis court. The tennis court includes a tennis net 193a, 193b. The tennis net 193a, 193b is made from a netting material which is shown in the video frames 191, 192 as a regularly repeating pattern.

As will be appreciated, when the right shutter frame 192 and the left shutter frame 191 are compared during disparity mapping, due to the repeating pattern of the net, the disparity process may alias the actual horizontal shift between the left shutter frame 191 and the right shutter frame 192.

FIGS. 18a to 18e provide schematic diagrams illustrating a technique for identifying portions of frames which contain content which may be likely to cause aliasing during disparity mapping.

Firstly one of the frames is self correlated using known image autocorrelation techniques. This may use one of Sub-harmonic summation of edge detected region or comb filtering of block match probability.

For the subharmonic summation, the region of interest is edge detected. For each scan line in the edge detected region it is summed with versions of that scan line compressed by a factor of 1, 2 or 3 to identify 'harmonic' structure. If the response of this scan line is above a threshold then it is classified as harmonic and therefore aliasing is likely to happen This region is then excluded from the disparity mapping calculation.

For comb filtering of block match probability results, the region of interest in the left shutter frame is block matched against a search area of the right shutter frame. This yields a block match probability matrix, with one probability value for each pixel of the search area. Rows of this matrix are processed in the same way as scan lines are in the subharmonic summation technique. Repeated structures will result in probability maxima at regular points across the matrix row, which are detected. The probability matrix is noisy which may produce a false positive response resulting from simply summing 'noise' in the probability matrix. So, a comb filter is applied to the probability matrix which has its teens spaced at a given spacing which relates to a given spatial frequency. The response at the teens is averaged and subtracted from the average of the response at the points equidistant between the teens. By subtracting the noise between the teens this reduces the likelihood of a false positive. This process is repeated with a range of comb filters that have their teens spaced at a range of distances corresponding to a range of spatial frequencies. Given the range of responses for a range of frequencies, if any one response is greater than a threshold then the scan line is classified as harmonic.

Figure 18A:
FIGS. 18a to 18e provide schematic diagrams illustrating a technique for identifying portions of frames which contain content which may be likely to cause aliasing during disparity mapping.

This results in an output as illustrated in FIG. 18a. FIG. 18a shows a schematic illustration of a graph taken across the width of the frame. Peaks 194 indicate areas of the picture that self correlate which indicate a repeating pattern.

Figure 18B:
Figure 18C:
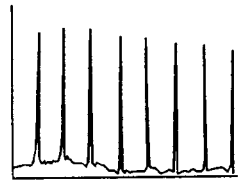
Figure 18D:
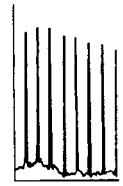

The graph shown in FIG. 18a is then reduced in size by half producing the graph shown in FIG. 18b. The graph shown in FIG. 18b is then reduced in size by half producing the graph shown in FIG. 18c. The graph shown in FIG. 18c is then reduced in size by half producing the graph shown in FIG. 18d. The data from graphs shown in FIG. 18a to FIG. 18d are then summed to produce the graph shown in FIG. 18e.

Figure 18E:

The graph shown in FIG. 18e includes a peak 195 which corresponds to the fundamental repeating frequency (i.e. harmonic) of the frame that has undergone the processing. If the peak is above a predetermined threshold level th, then this indicates that the repeating pattern in the frame is sufficiently pronounced that it may result in aliasing during disparity mapping.

The fact that the peak 195 is above the threshold level can then be used to ensure that aliasing does not occur, for example by ensuring that the portion of a frame in question which would produce aliasing does not undergo disparity mapping. A system for undertaking the technique illustrated with respect to FIGS. 18a to 18d is shown in FIG. 19.

Figure 19:
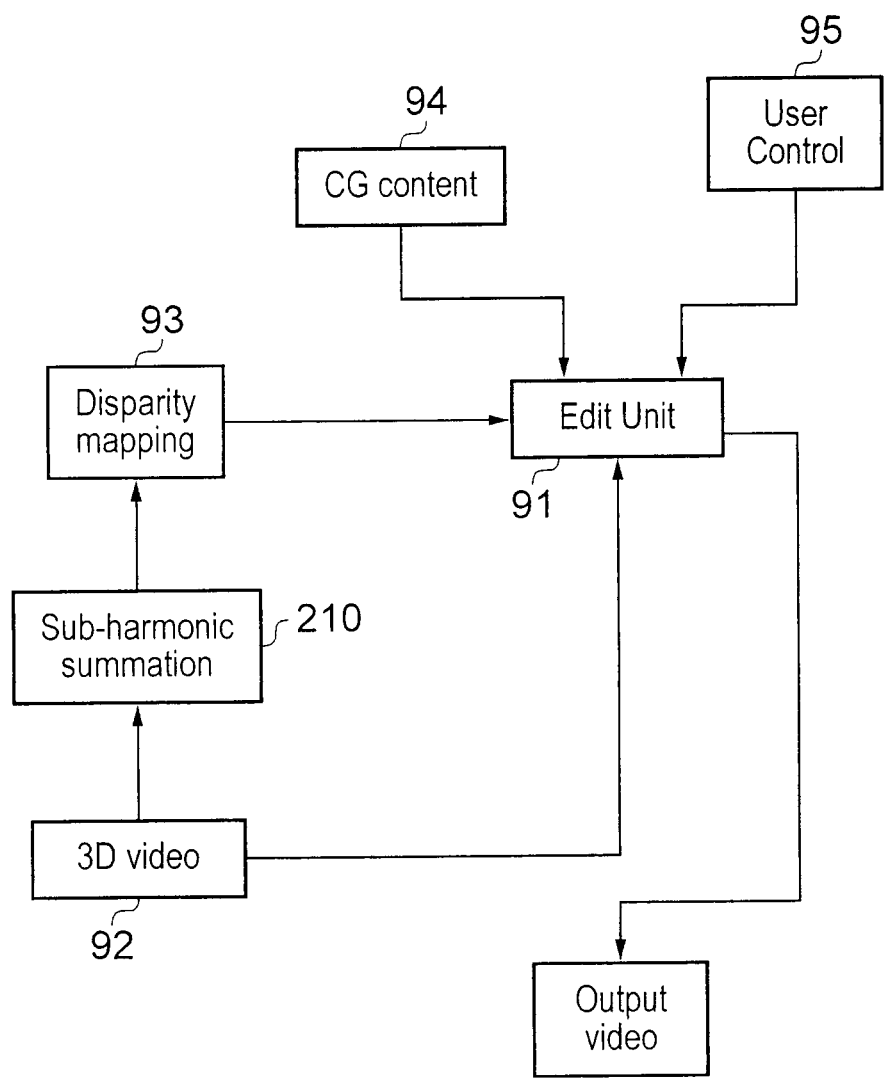
FIG. 19 provides a schematic diagram of a system for undertaking the technique illustrated in FIGS. 18a to 18e, and FIG. 20 provides a flow chart illustrating processes according to embodiments of the invention.

FIG. 19 shows a schematic diagram of a system which corresponds to that of FIG. 9 except that the system of FIG. 19 includes a sub-harmonic summation unit 210 between the video sequence source 92 and the disparity mapping unit.

The sub-harmonic summation unit 210 is arranged to perform the sub-harmonic summation process on at least one of the left and right shutter frame pair from the 3D video sequence stored in the video sequence source 92.

If the sub-harmonic summation unit 210 determines that the fundamental repeating frequency of the frame in question produces a peak above a threshold level as shown in FIG. 18e, the sub-harmonic summation unit 210 is arranged to send a signal to the disparity mapping unit 93 to ensure that it does not undertake disparity mapping on the portion of the frame where aliasing is likely to occur.

Figure 20:
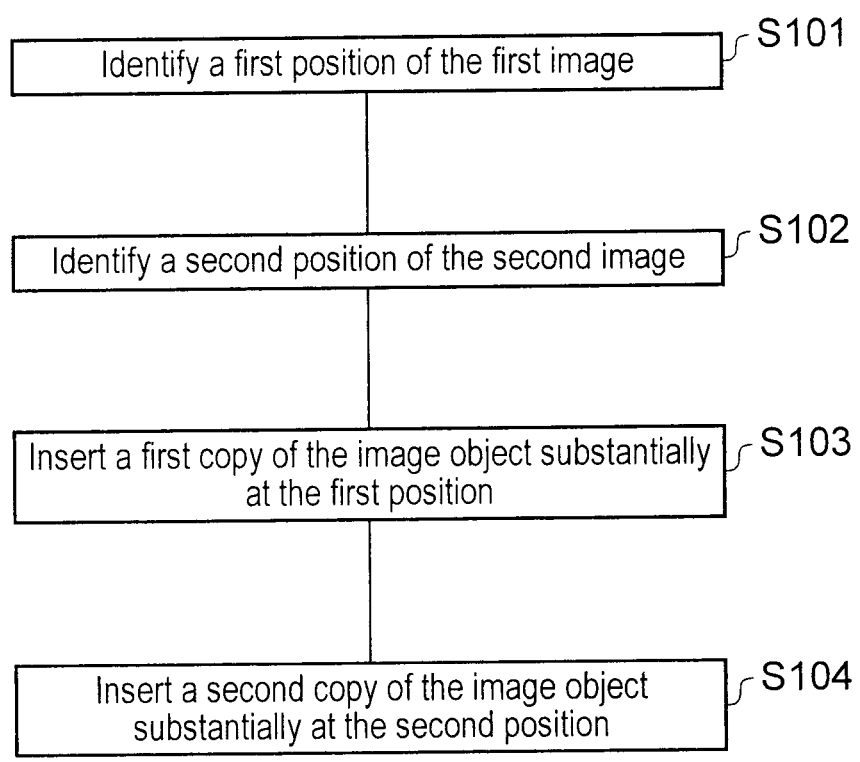

FIG. 20 shows a flow chart illustrating an example of a method of implementing the technique of reducing discomfort due to cutting from 3D images to 2D images described above in which a cut from a 3D image to a non-3D image in a video frame sequence is modified by replacing the 3D image by the non-3D image. The 3D image is perceivable by a viewer in an image plane of the video sequence due to a first image from the video frame sequence viewable by a viewer's left eye and a second image from the video frame sequence viewable by the viewer's right eye and the first image and second image are displaced relative to each other in the image plane. At step S101 a first position of the first image in the image plane is identified. At step S102 a second position of the second image in the image plane is identified. After the cut from the 3D image to the non-3D image at step S103 a first copy of the non-3D image substantially at the first position is inserted in a first post-cut frame of the video sequence. At step S104 a second copy of the non-3D image is inserted substantially at the second position of the first post-cut frame of the video sequence. The first copy of the non-3D image and the second copy of the non-3D image is inserted at positions in the image plane of a predetermined number of subsequent frames, the position at which the first and second copy are inserted gradually converging on a predefined point within the image plane.

It will be appreciated that in embodiments of the present invention, elements of the methods and systems described above may be implemented in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Although illustrative embodiments of the invention have been described in details herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of cutting between a first image sequence and a second image sequence displayable on a screen which defines a screen plane, wherein the first image sequence includes a stereoscopically viewable object perceivable by a viewer on a first image plane different to the screen plane and the second image sequence including a second object perceivable on a second image plane different to the first image plane, the stereoscopically viewable object comprising a first image at a first screen plane position and a second image at a second screen plane position, the method comprising:
   identifying the first screen plane position of the first image and the second screen plane position of the second image in the first image sequence, which is a 3D image sequence;
   inserting into a first post-cut frame of the second image sequence, which is a 2D image sequence, a first copy of the second object substantially at the first screen plane position and inserting a second copy of the second object substantially at the second screen plane position, and
   inserting the first copy of the second object and the second copy of the second object into a predetermined number of subsequent frames of the second image sequence at positions on the screen which are closer to the screen position required to view the second object at the second image plane, than the first and second screen plane position.

2. A method according to claim 1, wherein the change of the screen position between consecutive frames is the same over the predetermined number of frames.

3. A method according to claim 1, wherein the change of the screen position between consecutive frames varies over the predetermined number of frames.

4. A method according to claim 3 wherein the change of the screen position is smaller during a first predefined number of consecutive frames compared with a last predefined number of consecutive frames.

5. A method according to claim 1, wherein the second image plane is the screen plane.

6. A method according to claim 1, wherein the first and second positions are identified using a disparity map generated by a disparity mapping process.

7. A method according to claim 6 wherein the image sequence comprises a first group of stereoscopic image frames viewable by a viewer's eye and a second group of stereoscopic image frames viewable by the viewer's other eye, and the disparity map is generated by:
   performing a first edge pixel detection process on the first image frame to identify edges within the first image frame;
   identifying a feature pixel of the first image from the detected edges;
   generating a block of pixels including the feature pixel,
   performing block matching on a search region of the second image using the block of pixels from the first image frame, wherein the block of pixels generated from the first frame is correlated against the search region; and
   generating a disparity map by identifying a relative displacement of the feature pixel of the first image frame from a corresponding feature pixel in the second image frame.

8. A method according to claim 7, comprising generating from the disparity map a depth map providing an indication of a distance between the screen plane and the image plane by associating previously defined depth parameters indicating a depth of the stereoscopically viewable first object with the object position identified by the disparity map.

9. A method according to claim 8, comprising associating the stereoscopically viewable first object with a graphical indicator in dependence on the depth of the stereoscopically viewable first object indicated by the depth map or the disparity map.

10. A method according to claim 8, comprising associating the stereoscopically viewable first object with the graphical indicator if the depth is equal to or greater than a predetermined threshold parallax value.

11. A method according to claim 9, wherein the graphical indicator comprises applying a color to the 3D image.

12. A method according to claim 7, comprising performing a second edge pixel detection process on the second image frame to identify edges within the second image frame, determining a predicted edge pixels in the first image frame from an identified edge and the generated disparity map and verifying the disparity map when the position of the predicted edge pixel and the detected edge pixel in the first image are within a predetermined threshold distance.

13. A method according to claim 7, wherein prior to the edge pixel detection process, a sub-harmonic summation process is applied to an auto-correlated version of at least one of the first image frame and the second image frame to determine a magnitude of a fundamental frequency of a repeating pattern present in the at least one frame, and the edge pixel detection process and disparity processing steps are performed in dependence on the magnitude of the fundamental frequency of the at least one image frame.

14. A method according to claim 7, wherein disparity map includes horizontal displacement between the corresponding feature pixels and the edge detection process uses a Sobel edge detection technique.

15. A method according to claim 7, wherein the first edge detection process includes the step of segmenting the first image into a plurality of pixel blocks, and determining the number of edges in each pixel block, wherein if the number of edges is below a threshold value, that pixel block is deemed to have no edges located therein.

16. A method according to claim 15, wherein the threshold value is the same as the vertical number of pixels in the pixel block.

17. A method according to claim 15, wherein if the number of edges detected in a pixel block is above a second threshold value, then the number of edges in that pixel block is deemed to be the second threshold value.

18. An apparatus for cutting between a first image sequence and a second image sequence displayable on a screen which defines a screen plane, wherein the first image sequence includes a stereoscopically viewable object perceivable by a viewer on a first image plane different to the screen plane and the second image sequence including a second object perceivable on a second image plane different to the first image plane, the stereoscopically viewable object comprising a first image at a first screen plane position and a second image at a second screen plane position, the apparatus comprising:
   an identifying circuit configured to identify the first screen plane position of the first image and the second screen plane position of the second image in the first image sequence, which is a 3D image sequence; and
   an inserter circuit configured to insert into a first post-cut frame of the second image sequence, which is a 2D image sequence, a first copy of the second object substantially at the first screen plane position and inserting a second copy of the second object substantially at the second screen plane position, and configured to insert the first copy of the second object and the second copy of the second object into a predetermined number of subsequent frames of the second image sequence at positions on the screen which are closer to the screen position required to view the second object at the second image plane, than the first and second screen plane position.

19. An apparatus according to claim 18, wherein the change of the screen position between consecutive frames is the same over the predetermined number of frames.

20. An apparatus according to claim 18, wherein the change of the screen position between consecutive frames varies over the predetermined number of frames.

21. An apparatus according to claim 20 wherein the change of the screen position is smaller during a first predefined number of consecutive frames compared with a last predefined number of consecutive frames.

22. An apparatus according to claim 18, wherein the second image plane is the screen plane.

23. An apparatus according to claim 18, wherein the first and second positions are identified using a disparity map generated by a disparity mapping process.

24. An apparatus according to claim 23 wherein the image sequence comprises a first group of stereoscopic image frames viewable by a viewer's eye and a second group of stereoscopic image frames viewable by the viewer's other eye, and the disparity map is generated by a disparity map generator circuit configured to:
perform a first edge pixel detection process on the first image frame to identify edges within the first image frame;
identify a feature pixel of the first image from the detected edges;
generate a block of pixels including the feature pixel, perform block matching on a search region of the second image using the block of pixels from the first image frame, wherein the block of pixels generated from the first frame is correlated against the search region; and
generate a disparity map by identifying a relative displacement of the feature pixel of the first image frame from a corresponding feature pixel in the second image frame.

25. An apparatus according to claim 24, comprising a depth map generator circuit configured to generate from the disparity map a depth map providing an indication of a distance between the screen plane and the image plane by associating previously defined depth parameters indicating a depth of the stereoscopically viewable first object with the object position identified by the disparity map.

26. An apparatus according to claim 25, comprising an association circuit configured to associate the stereoscopically viewable first object with a graphical indicator in dependence on the depth of the stereoscopically viewable first object indicated by the depth map or the disparity map.

27. An apparatus according to claim 25, wherein the association circuit is configured to associate the stereoscopically viewable first object with the graphical indicator if the depth is equal to or greater than a predetermined threshold parallax value.

28. An apparatus according to claim 26, wherein the graphical indicator comprises applying a color to the 3D image.

29. An apparatus according to claim 24, comprising wherein the generator circuit is configured to perform a second edge pixel detection process on the second image frame to identify edges within the second image frame, determining a predicted edge pixels in the first image frame from an identified edge and the generated disparity map and verifying the disparity map when the position of the predicted edge pixel and the detected edge pixel in the first image are within a predetermined threshold distance.

30. An apparatus according to claim 24, wherein prior to the edge pixel detection process, a sub-harmonic summation process is applied to an auto-correlated version of at least one of the first image frame and the second image frame to determine a magnitude of a fundamental frequency of a repeating pattern present in the at least one frame, and the edge pixel detection process and disparity processing steps are performed in dependence on the magnitude of the fundamental frequency of the at least one image frame.

31. An apparatus according to claim 24, wherein disparity map includes horizontal displacement between the corresponding feature pixels and the edge detection process uses a Sobel edge detection technique.

32. An apparatus according to claim 24, wherein the first edge detection process includes the step of segmenting the first image into a plurality of pixel blocks, and determining the number of edges in each pixel block, wherein if the number of edges is below a threshold value, that pixel block is deemed to have no edges located therein.

33. An apparatus according to claim 32, wherein the threshold value is the same as the vertical number of pixels in the pixel block.

34. An apparatus according to claim 32, wherein if the number of edges detected in a pixel block is above a second threshold value, then the number of edges in that pixel block is deemed to be the second threshold value.

35. A non-transitory computer readable medium encoded with computer software which, when executed by a computer, causes the computer to execute the method of claim 1.

* * * * *